3,148,995
METHOD FOR IMPARTING IMPROVED PROPERTIES TO CLAYS AND CLAY-CONTAINING MATERIALS BY USE OF 2-AMINOPHENOLS AND COMPOSITIONS RESULTING THEREBY
John B. Hemwall, Midland, Mich., assignor to The Dow Chemical Company, Midland, Mich., a corporation of Delaware
No Drawing. Filed Mar. 18, 1963, Ser. No. 266,016
7 Claims. (Cl. 106—72)

This invention relates to novel compositions and procedures for imparting unique and improved properties to clays, including soils and other clay-containing materials and to certain uses of these unique materials. More specifically, this invention relates to compositions for treatment, and resulting compositions, of clay, including soils and other clay-containing materials, with certain 2-aminophenols, hereinafter 2-APS.

Clays and clay-containing materials are found naturally in various geological deposits, including soil. These materials have the properties of being dimensionally unstable and of forming fluid cohesive and adhesive mixtures in the presence of water. Conversely, upon drying, these materials become extremely dimensionally stable. While many of the uses of clay, clay soils and other clay-containing materials depend upon these properties, there are several uses for which such properties are a distinct handicap or even a complete bar.

Thus, when clay-containing soil or other clay-containing material is used as an integral constituent of the foundation, grade, base or structure in the construction of highways, runways, dams and buildings, the problem often arises that the clay-containing material loses a significant portion of its strength or load-bearing capacity in the presence of moisture or water. This is true even of materials which have been treated with common solidifying agents such as Portland cement or lime. Clay-containing soils which have been exposed to rain or irrigation water and subsequently dried often will form crusts through which plant penetration is very difficult or impossible.

In the past, it has been the practice to avoid the use of the clay-containing materials, to compensate for their shortcomings by other methods, or to use them in spite of their shortcomings. Thus, in the construction industry where it is desired to make use of local soils or aggregate, the presence of excessive amounts of clay in these materials has necessitated the hauling in of materials from other locations. This operation is expensive and, furthermore, suitable materials are frequently scarce. Another alternative has been to process the clay-containing aggregate so as to remove the clay. Again, this is an expensive procedure and is not always practical. Other alternative procedures involved using engineering techniques such as reinforced concrete, extra thick bases and grades, and pilings to compensate for the inferior properties of the clay-containing materials. These techniques, however, also are expensive. The final alternative is to maintain construction costs at a minimum and to use the inferior clay-containing materials. This, of course, results in increased maintenance costs throughout the years.

For agricultural purposes, it is impossible to avoid the use of a clay-containing soil where it exists, except to retire it from agricultural production. Frequently, however, the crusting problem with such soils is mitigated by the use of crops which are more capable of penetrating through crusts, or by planting several seeds together so that by their combined effort at least one plant will emerge, or by transplanting seedlings, in which case the plant does not need to penetrate the crusted soil surface. In many cases these are quite satisfactory solutions to the crusting problem. In other cases, however, these techniques impose restrictions on the grower that he would prefer to avoid. The other alternative used, of course, is to proceed in the hope that conditions necessary to crust formation do not occur before the plants have penetrated the soil surface. While this is frequently the case, there are numerous times when it is not, and severe losses to the farmer result. Thus, there is a definite need for clay, clay soils and other clay-containing materials for use as structural material precursors which, in the presence of water, have the properties of enhanced dimensional stability and of forming less cohesive and adhesive fluid mixtures, but which, when dried, have the property of less dimensional stability. Such clays, soils and other clay-containing materials can be considered to be less water sensitive.

It is an object of the present invention to provide unique compositions for the treatment of clays, clay soils and other clay-containing materials.

It is a further object to provide a unique method of treatment of clays, clay soils and other clay-containing materials.

A further object is to provide new compositions of clays, clay soils and other clay-containing materials which are characterized by decreased water sensitivity.

Another object is to provide unique compositions for the treatment of clay soils, including soils which contain an auxiliary solidifying agent such as Portland cement or lime, so that the treated soil is better suited for various civil engineering uses.

It is a further object to provide a unique method of treatment of clay soils, including soils which contain an auxiliary solidifying agent such as Portland cement or lime, so that the resulting soil is better suited for various civil engineering uses.

A further object is to provide new compositions of clay soils, including soils which contain an auxiliary solidifying agent such as Portland cement or lime, which are better suited for various civil engineering uses.

Still another object is to provide unique compositions for the treatment of clay soils so that the treated soil is less susceptible to crust formation.

It is a further object to provide a unique method of treatment of clay soils so that the soil is less susceptible to crust formation.

A further object is to provide new compositions of clay soils which are less susceptible to crust formation.

This invention is directed to the treatment, compositions for treatment, and resulting compositions of clays and clay-containing materials with 2-APS of the following formula

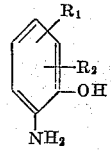

in which $R_1$ is Cl, R,

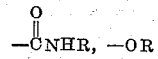

or

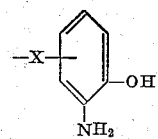

X is an alkylene group containing up to 3 carbon atoms; R is an alkyl, cyclic or combination alkyl and cyclic hydrocarbon group containing up to 18 carbon atoms; $R_2$ is H or $R_1$; and wherein $R_1$ and $R_2$ together may be interconnected to form with the benzene ring a naphthalene ring system; and the hydrochlorides of the foregoing compounds.

The 2-APS can be applied to the clay-containing material in several ways. The preferred way involves dispersing the compound either as a suspension or a solution in a liquid medium and admixing the resulting liquid dispersion with the clay-containing material via spraying, slurrying or other suitable methods. Suitable liquids for dispersion have a boiling point up to ca. 150° C. and include water, ketones, alcohols and hydrocarbon solvents, mixtures thereof and emulsions thereof, either oil-in-water or water-in-oil, in which the amount of active emulsifying agent does not exceed 25 percent of the amount of active compound in the formulation.

Because of the diverse nature of the 2-APS utilized in the practice of this invention, some types of compounds are soluble, dispersible or emulsifiable in relatively hydrophilic media, others in relatively hydrophobic media. Upon inspection of a chemical formula, the art skilled can generally determine a solvent, dispersion medium or emulsifier satisfactory for a given compound. In any event, the operability and desirability of a given solvent, dispersion medium or emulsifying agent can be determined by a simple test wherein a given compound is dissolved, suspended or its solution emulsified in a given medium. Obviously, solvents, diluents and emulsifying agents are used which are inert toward the 2-APS. Hereinafter, such solutions, suspensions and emulsions will sometimes be referred to broadly as dispersions and the solvent, suspension and emulsion media will be referred to broadly as dispersion media. Advantageously, the dispersion contains between 0.01 and 50 weight percent of the 2-APS.

Suitable clays are those classed as the kaolinitic, montmorillonitic, illitic and mixed layer type clays. Clay-containing materials are considered to be those artificial and natural materials which contain at least 5 percent by weight of any one type or mixture of such clays, dry basis. Clay-containing soils are considered to be those that contain at least 5 percent clay when analyzed for clay by the hydrometer method as described by Bouyoucos in Soil Science 44: 245–246. An auxiliary solidifying agent such as lime or Portland cement in amount of from about 1 to 100 weight percent, clay material basis, is advantageous in making structural materials.

The treatment of the clay or clay-containing material with one or more of the 2-APS should result in the clay or clay-containing material containing at least 0.0025 percent and advantageously up to about 2 percent by weight of the compound, dry clay basis. The upper limit is essentially economic. In the case of clay-containing soils these same limits hold, but are to be applied only to the actual volume of soil treated. Thus, when one of the 2-APS is used to decrease soil crusting, it is practical to treat only the soil immediately above the seed row. Depending upon how carefully the active compound is applied to this restricted volume of soil, anywhere from 0.1 pound to 10 pounds of the 2-APS is sufficient to treat one acre of crop land.

The following examples describe completely specific embodiments and the best mode contemplated by the inventor for carrying out his invention. They are not to be construed as limiting the invention, which is defined in the claims.

*Example 1*

Four grams of Portland cement was intimately mixed with 80 grams of a finely ground air-dried slightly acid clay loam soil. This mixture was then brought up to a moisture content of about 17 percent by spraying water from a glass chromatography sprayer onto the soil while subjecting the soil to additional mixing. One of the 2-APS, as set forth below, was immediately added to the soil by spraying 4 ml. of an acetone solution containing 80 mg. of the active compound with continuous mixing. This treatment resulted in the soil containing 5 percent Portland cement and 0.1 percent active compound on a dry soil weight basis.

Once the soil had been treated, it was placed in a cylindrical molding tube 3 cm. in diameter and compressed from both ends in a hydraulic press at a pressure of 740 p.s.i. until a static condition was attained. The molded treated soil was then immediately ejected from the molding tube and placed in a 100 percent relative humidity atmosphere to cure for a period of four days, followed by a one day cure at room humidity. Next, aliquots were immersed in water for one day, after which they were tested for unconfined compressive strength, hereafter designated UCS.

The unconfined compression test is a uniaxial compression test in which a cylindrical test specimen is provided with no lateral support while undergoing vertical compression. This test is a commonly accepted test used by civil engineers to determine the suitability of any soil or treated soil to resist shear caused by the various stresses placed on it. The immersion of the test cylinders in water for one day prior to performing the test is an accepted method of assessing the stability of the soil to water.

The following data were obtained with various 2-APS and soils (as described above) using an unconfined compression testing apparatus manufactured by Soiltest Incorporated, Model U-160. The rate of strain on the samples was about 0.07 inch per minute. The maximum stress which the samples could bear prior to failing was used to calculate the UCS of the sample via the method outlined in the manual provided by Soiltest, Incorporated, entitled "Unconfined Compression Testing of Cohesive Soils," dated 1957.

In each experiment conducted to provide the data for this example, one control was included. A control was prepared in a manner exactly analogous to the other treatments except that no active compound was present in the acetone added to the soil.

| 2-APS: | UCS, p.s.i. |
|---|---|
| (a) Control | 91 |
| 2-amino-4-methylphenol | 155 |
| (b) Control | 74 |
| 3-aminosalicylanilide | 241 |
| (c) Control | 0 |
| 2-amino-4-tert.-butylphenol | 228 |
| 2-amino-4-chloro-6-phenylphenol | 187 |
| 1-amino-2-naphthol hydrochloride | 164 |
| (d) Control | 0 |
| 2-amino-5-tert.-butylphenol | 216 |
| (e) Control | 0 |
| 2-amino-4,6-ditert.-butylphenol | 187 |
| (f) Control | 234 |
| 2-amino-4-phenylphenol | 328 |
| (g) Control | 63 |
| 2-amino-4-phenylphenol hydrochloride | 268 |
| (h) Control | 0 |
| 4,4'-isopropylidenebis(2-aminophenol) | 33 |
| (i) Control | 24 |
| 3-amino-4-hydroxy-N-octyl-benzamide | 345 |

*Example 2*

One hundred grams of a finely ground air-dried slightly acid clay loam soil was brought up to a moisture content of about 17 percent by spraying water from a glass chromatography sprayer onto the soil while subjecting the soil to thorough mixing. One of the 2-APS, as set forth in the following data, was immediately added to the soil by spraying on with mixing 5 to 10 ml. of an acetone solution containing 20 mg. of the compound. This treatment resulted in the soil containing 200 p.p.m. of the compound on a dry soil weight basis.

Once the soil had been treated, it was allowed to stand in the open air for at least two hours and then was dried in an oven at 30° C. overnight. The heated soil was then divided into replicates of 25 to 30 grams each and placed into rectangular molds 3.2 cm. wide by 6.4 cm. long. The soil in the molds was then leveled and compacted with a special compacting tool. The compacting tool has a base which covers the leveled soil sample and onto which was dropped a weight of 31.5 grams from a height of 31.5 cm. This weight was dropped repeatedly for six times, after which the soil was flooded with water. After the excess water had drained through the soil, the samples were dried overnight in an oven at 30° C. The resulting briquettes were then ready to be tested for their modulus of rupture.

The modulus of rupture (MR) is a test to determine the maximum stress that a material will withstand without breaking and is determined by subjecting a rectangular briquette to a bending moment. This test is commonly accepted by soil scientists as a measure of the crusting potential of a soil and, hence, its relative suitability as an agricultural soil. The lower the maximum stress before rupture, the less the crusting potential of the soil.

The modulus of rupture was determined on an apparatus patterned after that described by L. A. Richards in the Soil Science Society of America Proceeding 17: 321–323.

In each experiment conducted to obtain the data for this example, one control was included. The control was prepared exactly analogously to the other treatments except that no active compound was present in the acetone added to the soil.

| 2-APS: | MR, [1] millibars |
|---|---|
| (a) Control | 4780 |
| 3-aminosalicylanilide | 1560 |
| (b) Control | 4070 |
| 2-amino-4-tert.-butylphenol | 1090 |
| (c) Control | 4570 |
| 2-amino-5-tert.-butylphenol | 0 |
| (d) Control | 5740 |
| 2-amino-4,6-ditert.-butylphenol | 3120 |
| (e) Control | 3820 |
| 2-amino-4,6-dichlorophenol | 2570 |
| (f) Control | 6200 |
| 2-amino-4-phenylphenol hydrochloride | 1700 |
| (g) Control | 4300 |
| 2 - amino-6-chloro-4-cyclohexylphenol hydrochloride | 0 |
| (h) Control | 7500 |
| 2-amino - 6 - chloro-4-(1,1,3,3-tetramethyl-butyl)-phenol hydrochloride | 1500 |
| (i) Control | 7700 |
| 4,4′-isopropylidenebis(2-aminophenol) | 4200 |
| (j) Control | 6000 |
| 3-amino-4-hydroxy-N-octyl-benzamide | 0 |
| (k) Control | 10200 |
| 2-amino-4-phenoxyphenol | 8700 |

[1] MR in millibars=$3FL/2000\ bd^2$ where F is the breaking force in dynes, L is the distance between the bars supporting the briquette, b is the width and d is the thickness of the briquette, L, b and d being expressed in centimeters.

*Example 3*

A quantity of 1.6 grams of aqueous 85 percent $H_3PO_4$ was dissolved in about 14 ml. of distilled water. This solution was then sprayed from a glass chromatography sprayer onto 80 grams of a finely ground air-dried slightly acid clay loam soil. One of the 2-APS was immediately added to the soil by spraying 3.2 ml. of an acetone solution containing 32 mg. thereof. This treatment resulted in the soil containing 2 percent $H_3PO_4$ and 0.04 percent active compound on a dry soil weight basis.

Once the soil had been treated, it was placed in a cylindrical molding tube 3 cm. in diameter and compressed from both ends in a hydraulic press at a pressure of 740 p.s.i. until a static condition was attained. The sample was then immediately ejected from the molding tube and placed in a 100 percent relative humidity atmosphere to cure for a period of five days, followed by three hours cure at room humidity. Next, the samples were immersed in water for one day, after which they were tested for UCS as described above.

In each experiment conducted one blank was included. The blank was prepared exactly analogous to the other treatments except that no compound was present in the acetone added to the soil.

The results from this experiment are shown below.

| 2-APS: | UCS, p.s.i. |
|---|---|
| (a) Control | 121 |
| 2-amino-6-chloro-4-cyclohexylphenol hydrochloride | 353 |
| (b) Control | 163 |
| 2-amino-6-chloro-4-(1,1,3,3-tetramethyl-butyl)-phenol hydrochloride | 322 |
| (c) Control | 10200 |
| 2-amino-4-phenoxyphenol | 8700 |

What is claimed is:

1. The method of treatment of clays and clay-containing materials by applying to the surface particles thereof a compound having the generic formula

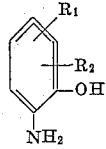

in which $R_1$ is a member of the group consisting of Cl, R,

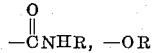

and

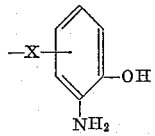

X is an alkylene group containing up to 3 carbon atoms; R is a member of the group consisting of an alkyl, cyclic and combination alkyl and cyclic hydrocarbon group containing up to 18 carbon atoms; $R_2$ is a member of the group consisting of H and $R_1$; and wherein $R_1$ and $R_2$ together may be interconnected to form with the benzene ring a naphthalene ring system; and the hydrochlorides of the foregoing compounds; in amount sufficient to provide at least 0.0025 weight percent of said compound, dry clay basis.

2. A mixture of a clay material of the group consisting of clay, clay soils and clay structural material precursors containing at least 0.0025 weight percent, dry clay basis, of a compound having the generic formula

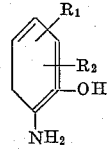

in which $R_1$ is a member of the group consisting of Cl, R, —CNHR, —OR, and

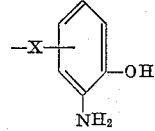

X is an alkylene group containing up to 3 carbon atoms; R is a member of the group consisting of an alkyl, cyclic and combination alkyl and cyclic hydrocarbon group containing up to 18 carbon atoms; $R_2$ is a member of the group consisting of H and $R_1$; and wherein $R_1$ and $R_2$ together may be interconnected to form with the benzene ring a naphthalene ring system; and the hydrochlorides of the foregoing compounds; said clay material containing at least 5 weight percent of clay, dry weight basis.

3. The mixture of claim 2 in which the clay material contains at least 5 weight percent clay, dry basis, and from 1 to 100 weight percent of at least one member of the group consisting of Portland cement and lime, clay material basis.

4. The mixture of claim 2 in which the compound is 2-amino-4-tert.-butylphenol.

5. The mixture of claim 2 in which the compound is 2-amino-5-tert.-butylphenol.

6. The mixture of claim 2 in which the compound is 2-amino-4-phenylphenol hydrochloride.

7. The mixture of claim 2 in which the compound is 2-amino-6-chloro-4-(1,1,3,3-tetramethylbutyl)-phenol hydrochloride.

References Cited in the file of this patent
UNITED STATES PATENTS

| | | |
|---|---|---|
| 2,752,260 | Hawkins et al. | June 26, 1956 |
| 2,761,837 | Brown et al. | Sept. 4, 1956 |